United States Patent [19]

Kashiwadate et al.

[11] Patent Number: 5,008,370

[45] Date of Patent: Apr. 16, 1991

[54] POLY(ARYLENE THIOETHER-KETONES) IMPROVED IN MELT STABILITY AND PREPARATION PROCESS THEREOF

[75] Inventors: Ken Kashiwadate; Yoshikatsu Satake, both of Iwaki; Takashi Kaneko, Shiroyama; Masahiro Tada, Matsudo; Takayuki Katto, Iwaki, all of Japan

[73] Assignee: Kureha Kagaku Kogyo K.K., Japan

[21] Appl. No.: 431,118

[22] Filed: Nov. 3, 1989

[30] Foreign Application Priority Data

Nov. 11, 1988 [JP] Japan .................. 63-283553

[51] Int. Cl.$^5$ ............................................ C08F 283/00
[52] U.S. Cl. .................................... 528/481; 528/226; 528/388
[58] Field of Search .................. 528/226, 388, 481

[56] References Cited

U.S. PATENT DOCUMENTS 4,690,972  9/1987  Johnson et al. .
4,716,212  12/1987  Gaughan .

FOREIGN PATENT DOCUMENTS

0270955A2   6/1988   European Pat. Off. .
0274754A2   7/1988   European Pat. Off. .
0280325A2   8/1988   European Pat. Off. .
0285874A1   10/1988  European Pat. Off. .
3405523A1   8/1985   Fed. Rep. of Germany .
47-13347    7/1972   Japan .
60-58435    4/1985   Japan .
60-104126   8/1985   Japan .
61-221229   1/1986   Japan .

OTHER PUBLICATIONS

D. Mukherjee et al., "Preparation & Characterisation of Poly(4,4'-benzophenone Sulphide)", Depart of Chemistry, Indian Institute of Technology, Aug. 1981, pp. 501-502.

Primary Examiner—Morton Foelak
Attorney, Agent, or Firm—Lowe, Price, LeBlanc, Becker & Shur

[57] ABSTRACT

Disclosed herein is a process for the preparation of a poly(arylene thioether-ketone) improved in melt stability, which comprises subjecting a poly(arylene thioether-ketone) (PTK) to a heat treatment for $5-5 \times 10^3$ minutes in a powdery state and a temperature range of 200°–350° C. The PTK has predominant recurring units of the formula

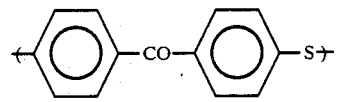

and has a melting point, Tm of 310°–380° C., a melt crystallization temperature, Tmc (420° C./10 min) of at least 210° C., a residual melt crystallization enthalpy, ΔHmc (420° C./10 min) of at least 10 J/g and a reduced viscosity of 0.2–2.0 dl/g. PTKs improved in melt stability and prepared in accordance with the above-described preparation process are also disclosed.

5 Claims, No Drawings

POLY(ARYLENE THIOETHER-KETONES) IMPROVED IN MELT STABILITY AND PREPARATION PROCESS THEREOF

FIELD OF THE INVENTION

This invention relates to poly(arylene thioetherketones) having predominant recurring units of the formula

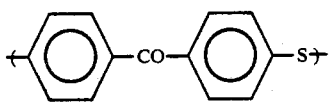

and improved in melt stability, and more specifically to a poly(arylene thioether-ketone) improved in melt stability, which has been obtained by subjecting a melt-stable poly(arylene thioether-ketone) permitting application of conventional melt processing techniques to a heat treatment in a powdery state, and a preparation process thereof.

BACKGROUND OF THE INVENTION

In recent years, there has been a strong demand for crystalline, heat-resistant thermoplastic resins having a melting point of about 300° C. or higher and permitting easy melt processing in the fields of the electronic and electric industry, automobile, aircraft and space industries.

Attention has recently given to poly(arylene thioether ketones) (hereinafter abbreviated as "PTKs") owing to their high melting points and PTKs have hence been studied.

There are disclosure on PTKs, for example, in Japanese Patent Laid-Open No. 58435/1985 (hereinafter referred to as "Publication A"), German Offenlegungssschrift 34 05 523Al (hererinafter referred to as "Publication B"), Japanese Patent Laid-Open No. 104126/1985, Japanese Patent Laid-Open No. 13347/1972, Indian J. Chem., 21A, 501–502 (May, 1982), Japanese Patent Laid-Open No. 221229/1986, U.S. Pat. No. 4,716,212 (hereinafter referred to as "Publication C"), U.S. Pat. No. 4,690,972, European Patent Publication No. 0,270,955 A2 (hereinafter referred to as "Publication D"), European Patent Publication No. 0,274,754 A2 (hereinafter referred to as "Publication E"), European Patent Publication No. 0,280,325 A2 (hereinafter referred to as "Publication F"), and European Patent Publication No. 0,285,874 A1 (hereinafter referred to as "Publication G").

Regarding the PTKs described in the above publications, neither molding nor forming has however succeeded to date in accordance with conventional melt processing techniques. Incidentally, the term "conventional melt processing techniques" as used herein means usual melt processing techniques for thermoplastic resins, such as extrusion, injection molding and melt spinning.

The unsuccessful molding or forming of PTKs by conventional melt processing techniques is believed to be attributed to &he very poor melt stability of the prior art PTKs, which tended to loss their crystallinity or to undergo crosslinking and/or carbonization, resulting in a rapid increase in melt viscosity, upon their melt processing.

It was attempted to produce some molded or formed products in Publications A and B. Since the PTKs had poor melt stability, certain specified types of molded or formed products were only obtained by a special molding or forming process, where PTKs were used only as a sort of binder, being impregnated into or mixed with a great deal of reinforcing fibers of main structural materials and molded or formed under pressure.

The present inventors conducted an extensive investigation with a view toward developing a process for economically producing a PTK which has melt stability permitting the application of conventional melt processing techniques. As a result, it was found that PTKs, which were improved significantly in melt stability compared to the conventional PTKs and hence permitted the application of conventional melt processing techniques (hereinafter referred to as "melt-stable PTKs"), can be obtained (Japanese patent Laid-Open No. 54031/1989).

Even such melt-stable PTKs were however still unable to avoid certain degrees of thermal modification and deterioration when melt-processed from powdery polymers into pellets or molded or formed products, whereby they underwent melt viscosity increase and/or decrease of crystallinity and develop sticking of thermal decomposition products to resin residence areas of melt processing equipment. They hence involved a problem that difficulties were encountered in determining appropriate conditions for their melt processing.

It therefore arose, as a subject to be investigated, to make further improvements to the melt stability of the melt-stable PTKs upon their melt processing.

The present inventors proceeded with an investigation in order to solve such a subject. As a result, it was found that when basic compounds such as the hydroxides and oxides of Group IA or IIA metals of the periodic table are added to the melt-stable PTK, their melt stability upon melt processing can be improved further (Japanese Patent Application No. 142772/1988).

It was however found that there are problems that when large amounts of such basic compounds are added to the melt-stable PTKs, their physical properties may possibly be lowered and the amounts to be added are hence limited involuntarily.

OBJECTS AND SUMMARY OF THE INVENTION

An object of this invention is to provide PTKs excellent in melt stability upon melt processing.

Another object of this invention is to provide PTKs prevented, upon melt processing, from melt viscosity increase and decrease of crystallinity and also from sticking of thermal decomposition products to resin residence areas of melt processing equipment.

The present inventors have proceeded with a further investigation in order to solve the above-described problems involved in the prior art. As a result, it has been found that PTK improved in melt stability upon melt processing is obtained by subjecting the above-described melt-stable PTK to a heat treatment in a powdery state and a specific temperature range lower than its melting point.

It has not been expectable that PTKs themselves can be modified by the heat treatment without using any heat stabilizers to improve their melt stability. The reason is that PTKs obtained in accordance with the conventionally-known preparation processes are poor in melt stability and the heat treatment of the PTKs hence accelerates viscosity increase and decrease of crystallinity upon their melting.

With respect to the heat treatments of the conventionally-known PTKs, for example, in Publication A, it is disclosed to heat PTK in an oxidizing atmosphere such as air, thereby causing molecular-chain extension, crosslinking and/or branching to occur so as to increase its apparent melt viscosity, and to subject PTK to a heat treatment at 130°-320° C. for 1 second through 10 hours in order to control the crystallinity of molded or formed products of PTK.

In Publication B, there is disclosed a preparation process of fibrous composites, wherein fibers, or molded or formed fibers are impregnated with PTK and the resultant product not quite complete is then subjected to a heat treatment, whereby the PTK portion is crosslinked.

It is disclosed in Publication C to cure PTK in an air oven heated to 316° C. in order to increase the molecular weight of PTK. Namely, it is described therein that the inherent viscosity of the polymer is increased by the heat treatment, resulting in a polymer insoluble in sulfuric acid in time, and foaming from the polymer is recognized in the course of the heat treatment.

Publication D discloses about melt stability when PTK is subjected to a heat treatment at 371° C. Namely, it is reported therein that the melt flow rates of PTK after holding it for 10 minutes and 15 minutes at 371° C. reduced from 100.4 g/10 min when holding it for 5 minutes at 371° C. to 17.9 g/10 min and 0 g/10 min, respectively, and its melt viscosity increases. In both Publications E and F, there are also disclosure to the effect that melt flow rates of PTKs significantly decrease when holding it at 371° C.

In Publication G, it is described that the melt stability of PTK can be enhanced by curing calcium ion-treated PTK. It is described in Example V thereof that the melt flow rates of such PTK after holding it for 10 minutes and 15 minutes at 371° C. reduced from 160 g/10 min when holding it for 5 minutes at 371° C. to 95 g/10 15 min and 35 g/10 min, respectively, As described above, all the PTKs described in the above publications undergo crosslinking by the heat treatment to increase their melt viscosities. These polymers are hence poor in melt stability.

The present inventors have however been found that the above-described melt-stable PTK, which has melt stability sufficient to permit the application of conventional melt processing techniques, is further improved in melt stability when subjecting it to a heat treatment at a high temperature not higher than its melting point.

The present invention has been brought to completion on the basis of these findings.

In one aspect of this invention, there is thus provided a process for the preparation of a poly(arylene thioether-ketone) improved in melt stability, which comprises subjecting a poly(arylene thioether-ketone) to a heat treatment for $5 - 5 \times 10^3$ minutes in a powdery state and a temperature range of 200°-350° C., said poly(arylene thioether-ketone) having predominant recurring units of the formula

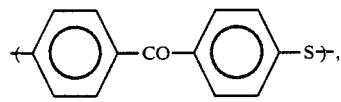, wherein the —CO— and —S— are in the para position to each other, and having the following physical properties (a)-(c):

(a) melting point, Tm being 310°-380° C.;
(b) melt crystallization temperature, Tmc (420° C./10 min) being at least 210° C., and residual melt crystallization enthalpy, ΔHmc (420° C./10 min) being at least 10 J/g, wherein Tmc (420° C./10 min) and ΔHmc (420° C./10 min) are determined by a differential scanning calorimeter at a cooling rate of 10° C./min after the poly(arylene thioether-ketone) is held at 50° C. for 5 minutes in an inert gas atmosphere, heated to 420° C. at a rate of 75° C./min and then held for 10 minutes at 420° C.; and
(c) reduced viscosity being 0.2-2.0 dl/g as determined by viscosity measurement at 25° C. and a polymer concentration of 0.5 g/dl in 98 percent by weight sulfuric acid.

In another aspect of this invention, there is also provided a poly(arylene thioether-ketone) improved in melt stability, which has been produced in accordance with the above-described preparation process.

DETAILED DESCRIPTION OF THE INVENTION

Features of the present invention will hereinafter be described in detail.

Melt-Stable PTKs

Chemical Structure of PTKs

The melt-stable PTKs according to the present invention are poly(arylene thioether-ketones) having predominant recurring units of the formula

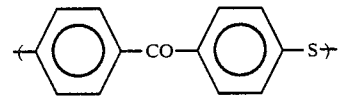

wherein the —CO— and —S— are in the para position to each other.

In order to be heat-resistant polymers, the PTKs employed in this invention may preferably contain the above recurring units in a proportion of at least 50 wt.%, more preferably, of 60 wt.% or higher, most preferably, of 70 wt.% or higher. If the proportion of the recurring units is less than 50 wt.%, there is a potential problem that the crystallinity of the polymer is reduced and its heat resistance is reduced correspondingly.

Exemplary recurring units other than the above recurring units may include:

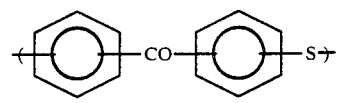

(except for the recurring unit in which the —CO— and —S— are in the para position to each other.);

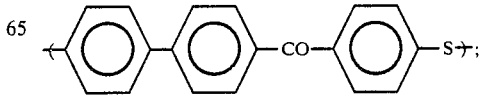

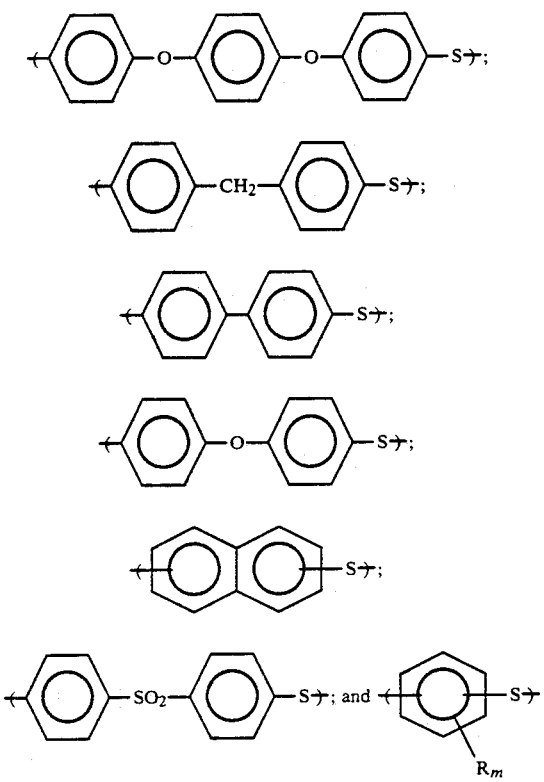

(wherein R means an alkyl group having 5 or less carbon atoms and m stands for an integer of 0-4.).

Incidentally, PTKs having a partially crosslinked and/or branched structure to such an extent not impairing their melt stability flowability and crystallinity are still acceptable as the PTKs of the present invention. For example, PTKs obtained by conducting polymerization in the presence of a small amount of a crosslinking agent (e.g., polychlorobenzophenone, polybromobenzophenone or the like) can be regarded as PTKs usable in this invention.

Physical Properties of PTKs

The melt-stable PTKs useful in the practice of this invention have the following physical properties.

(1) Heat resistance:

The melting point, Tm of a polymer may serve as an index of the heat resistance of the polymer.

The PTKs useful in the practice of this invention have a melting point, Tm of 310°–380° C., preferably 320°–375° C., more preferably 330°–370° C. Those having a melting point, Tm lower than 310° C. are insufficient in heat resistance. On the other hand, it is difficult to perform the melt processing of those having a melting point, Tm higher than 380° C. without decomposition. Such an excessively low or high melting point is undesired.

(2) Melt stability:

The greatest feature of the PTKs useful in the practice of this invention resides in that they have melt stability sufficient to permit application of conventional melt processing techniques.

It is hence possible to obtain an index of the melt processability of a PTK by investigating the residual crystallinity of the PTK after holding it at an elevated temperature of its melt processing temperature or higher for a predetermined period of time.

The residual crystallinity can be evaluated quantitatively by determining its melt crystallization enthalpy by means of a differential scanning calorimeter (hereinafter abbreviated as "DSC"). Specifically, the melt crystallization temperature, Tmc (420° C./10 min) of the PTK and its residual melt crystallization enthalpy, ΔHmc (420° C./10 min) of the PTK, which are determined at a cooling rate of 10° C./min after the PTK is held at 50° C. for 5 minutes in an inert was atmosphere, heated to 420° C. at a rate of 75° C./min and then held for 10 minutes at a temperature of 420° C. (an elevated temperature of its melt processing temperature or higher), can be used as measures of its melt stability. In the case of a PTK having poor melt stability, it undergoes crosslinking or the like at the above high temperature condition of 420° C./10 min and loses its crystallinity substantially.

The melt-stable PTKs employed in this invention are polymers whose ΔHmc (420° C./10 min) are at least 10 J/g, preferably at least 15 J/g, more preferably at least 20 J/g and whose Tmc (420° C./10 min) are at least 210° C., preferably at least 220° C., more preferably at least 230° C.

A PTK, whose ΔHmc is smaller than 10 J/g or whose Tmc (420° C./10 min) is lower than 210° C., tends to lose its crystallinity or to induce a melt viscosity increase upon its melt processing, so that difficulties are encountered upon application of conventional melt processing techniques.

The melt viscosity increment in terms of times is measured, for example, by maintaining a PTK at 385° C. (an elevated temperature higher than its melting point) for varied periods of time and calculating the increment between its melt viscosities for the varied heating periods. It can therefore be used as an index of the melt stability of the PTK. The melt-stable PTKs useful in the practice of this invention have a melt viscosity increment in terms of times, $Y_0 = (\eta_{30}^*)_0/(\eta_5^*)_0$ of 10 or smaller, preferably, of 8 or smaller.

Here, $(\eta_5^*)_0$ and $(\eta_{30}^*)_0$ mean the melt viscosities of the non-heat-treated PTK (PTK before heat treatment) as measured at a shear rate of 1200 sec$^{-1}$ after holding it at 385° C. for 5 minutes and 30 minutes respectively.

A PTK having $Y_0$ greater than 10 times has a problem that it undergoes crosslinking upon melt processing and hence lowers its crystallinity.

(3) Molecular weight:

In this invention, the reduced viscosity, $\eta_{red}$ of a PTK can be used as an index of its molecular weight.

As PTKs suitable for use in melt processing, high-molecular weight PTKs whose reduced viscosities, $\eta_{red}$ are 0.2–2 dl/g, preferably 0.3–2 dl/g, more preferably 0.5–2 dl/g are desired.

Here, the reduced viscosity, $\eta_{red}$ is expressed in terms of a value as determined by viscosity measurement at 25° C. and a polymer concentration of 0.5 g/dl in 98 percent by weight sulfuric acid.

Since a PTK whose $\eta_{red}$ is lower than 0.2 dl/g has a low melt viscosity and high tendency of drawdown, it is difficult to apply conventional melt processing techniques. Further, molded or formed products obtained from such a PTK are insufficient in mechanical properties and the like. On the other hand, a PTK whose $\eta_{red}$ exceeds 2 dl/g is very difficult in production and processing.

(4) Crystallinity:

As an index of the crystallinity of a polymer, its density is used.

The PTKs employed in this invention are desirably polymers whose densities (at 25° C.) are preferably at least 1.34 g/cm³, more preferably at least 1.35 g/cm³ when measured in a crystallized form by annealing them at 280° C. for 30 minutes.

Those having a density lower than 1.34 g/cm³ have potential problems that they may have low crystallinity and hence insufficient heat resistance and their processability such as injection-moldability and the mechanical properties and the like of resulting molded or formed products may also be insufficient. Those having such low densities are hence not preferred.

In particular, PTKs crosslinked to a high degree (the PTKs described in Publication A) have been reduced in crystallinity and their densities are generally far lower than 1.34 g/cm³.

Preparation Process of PTKs

The melt-stable PTKs useful in the practice of this invention can each be produced by polymerizing an alkali metal sulfide and a dihalogenated aromatic compound, preferably, dichlorobenzophenone and/or dibromobenzophenone, for a short period of time, in the substantial absence of a polymerization aid (a salt of a carboxylic acid, or the like), in an aprotic polar organic solvent, preferably, an organic amide solvent (including a carbamic amide or the like) and in a system having water content far higher compared with conventionally reported polymerization processes while controlling the temperature profile suitably, and if necessary, by choosing the material of a reactor suitably.

Described specifically, the melt-stable PTKs employed in the present invention can each be produced suitably by subjecting an alkali metal sulfide and a dihalogenated aromatic compound consisting principally of 4,4'-dichlorobenzopheone and/or 4,4'-dibromobenzophenone to a dehalogenation or sulfuration reaction under the following conditions (a)–(c) in an organic amide solvent.

(a) ratio of the water content to the amount of the charged organic amide solvent being 2.5–15 (mole/kg);

(b) ratio of the amount of the charged dihalogenated aromatic compound to the amount of the charged alkali metal sulfide being 0.95–1.2 (mole/mole); and (c) reaction temperature being 60°–300° C. with a proviso that the reaction time at 210° C. and higher is within 10 hours.

The melt stable PTKs can be obtained more suitably when a reactor at least a portion of which, said portion being brought into contact with the reaction mixture, is made of a titanium material.

If desired, at least one halogen-substituted aromatic compound having at least one substituent group having electron-withdrawing property at least equal to —CO— group (preferably, 4,4'-dichlorobenzophenone and/or 4,4'-dibromobenzophenone employed as a monomer) may be added and reacted in a final stage of the polymerization (as a stabilization treatment in a final stage of the polymerization) so as to obtain PTKs improved still further in melt stability.

These PTKs excellent in melt stability and useful in the practice of this invention can each be produced in accordance with the process described in Japanese Patent Laid-Open No. 64031/1989.

Heat Treatment for the Improvement of Melt Stability

The process for the preparation of PTKs improved in melt stability according to this invention is characterized in that the above-described melt-stable PTK is subjected to a heat treatment under specific conditions.

Condition for the heat treatment will hereinafter be described specifically.

The heat treatment is conducted under the following conditions:

(1) the melt-stable PTK being in a powdery state;

(2) temperature range being 200°–350° C.; and (3) treating time being $5-5\times10^3$ minutes.

Further, when the degree of the heat treatment is measured from the degree of improvement in the melt stability of the melt-stable PTK, (4) the heat treatment is carried out in such a manner that the ratio $\eta_5^*/(\eta_5^*)_0$ is 2 or less, and moreover the heat treatment is performed under conditions of the above-described temperature range and treating time in such a manner that the melt viscosity increment in terms of times, $Y = \eta_{30}^*/\eta_5^*$ is 3.5 or less and the ratio $Y/Y_0$ is 0.7 or less. Here, $\eta_5^*$ and $\eta_{30}^*$ mean the melt viscosities of the PTK after the heat treatment as measured at a shear rate of 1200 sec$^{-1}$ after holding it at 385° C. for 6 minutes and 30 minutes respectively.

These conditions for the heat treatment will hereinafter be described in detail.

(1) Powdery state

The reason why the heat treatment of the PTK is conducted in the powdery state (solid state) is that the heat treatment at an elevated temperature can be effected more simply than that in a solution state and abnormal reactions such as decomposition hardly occur compared to the heat treatment in the molten state.

To conduct the heat treatment of a PTK in a powdery state means to perform the heat treatment in a temperature range lower than the melting point of the PTK.

When the PTK is subjected to the heat treatment in the powdery state, it is possible to make volatile materials generated from the polymer in the course of the heat treatment, for example, oligomers, residual monomers, water and emissions from the reaction product having a thermally unstable structure liable to vaporize.

Although no particular limitation is imposed on the size of the powder, powder having an average particle size of 70 μm or smaller, preferably 60 μm or smaller, more preferably 50 μm or smaller is suitable from the viewpoint of easiness in the vaporization of the volatile materials.

(2) Temperature range:

The heat treatment is conducted in a temperature range of 200°–350° C., preferably 250°–350° C., more preferably 275°–340° C. It is however necessary to be a temperature range not exceeding the melting point of the PTK because the heat treatment is performed in the powdery state.

If the temperature for the heat treatment is lower than 200° C., a long period of time is required to increase the melt stability of the melt-stable PTK. Such a low temperature is hence disadvantageous from the viewpoint of productivity. On the other hand, any high temperatures exceeding 350° C. are accompanied by a potential problem that the PTK undergoes abnormal reactions such as decomposition and crosslinking. It is hence not preferable to conduct the heat treatment at such a high temperature.

(3) Treating time

The treating time is in a range of $5-5\times10^3$ minutes, preferably $10-3\times10^3$ minutes, more preferably $20-1\times10^3$ minutes.

If the treating time is shorter than 5 minutes, the heat treatment becomes insufficient and there is hence a potential problem that effects to improve the melt stability of the PTK are insufficient. On the other hand, any treating time exceeding $5\times10^3$ minutes is disadvantageous form the viewpoint of productivity.

(4) Other conditions for the heat treatment

The heat treatment may be conducted in a vacuum (under reduced pressure), in an inert gas atmosphere such as a nitrogen gas or in an oxidizing gas atmosphere such as air. However, when the heat treatment of the PTK is performed in the oxidizing gas atmosphere, there is a potential problem that molecular-weight increase due to its crosslinking, branching or other reaction occurs, and the melt viscosity of the heat treated PTK hence increases. It is therefore preferable to suitably control both temperature and treating time within the above-described ranges so as to conduct the heat treatment either at a relatively low temperature or for a relatively short period of time.

(5) Degree of the heat treatment

The greatest feature of the PTKs employed in the present invention resides in that they have melt stability sufficient to permit application of conventional melt processing techniques. It is hence possible to improve further the melt stability of the PTKs without undergoing substantially a crosslinking, branching or molecular-chain extending reaction or the like.

When the degree of the improvement in the melt stability of the PTK is measured from its melt viscosity increment in terms of times as an index, the heat treatment is performed in such a manner that the ratio $\eta_5^*/(\eta_5^*)_0$ is 2 or less, i.e., in a range of 2–0.5, preferably 1.4–0.7, more preferably 1.2–0.8.

In general, the melt-stable PTKs employed in this invention do not substantially undergo a curing reaction by the above-described heat treatment. Therefore, the above ratios substantially have the value of one (a range of 0.8–1.2) in many cases. In this point, the present invention is distinguished from the prior art wherein the PTKs poor in melt stability compared with the present-invented PTKs have been treated with heat so as to conduct a curing reaction, resulting in an increase in melt viscosity.

By the above-described heat treatment, the melt-stable PTKs in the present invention are restrained in the upward tendency of their melt viscosities compared with the non-heat-treated PTKs and hence improved further in their melt stability.

Therefore, when the degree of the improvement in the melt stability is measured from the melt viscosity increment in terms of times of the heat-treated PTK, it is preferred that the heat treatment according to this invention is conducted until the melt viscosity increment in terms of times, $Y=\eta_{30}^*/\eta_5^*$ of the heat-treated PTK becomes 3.5 or less, preferably 3.0 or less, more preferably 2.0 or less and the ratio $Y/Y_0$ becomes 0.7 or less, preferably 0.6 or less, more preferably 0.5 or less.

It is preferred that $\eta_5^*/(\eta_5^*)_0$ is 2 or less, or else the crystallinity and flowability inherent in the PTK would be lowered upon subjecting it to the heat treatment.

In order to have excellent conventional melt processability, the heat-treated PTK whose melt viscosity increment in terms of times, Y is 3.5 or less is desired. In order for PTK to have such an increment, as a non-heat-treated PTK (PTK before the heat treatment), a melt-stable PTK whose melt viscosity increments in terms of times, $Y_0$ are 10 or less is used.

If the melt viscosity increment in terms of times, Y exceeds 3.5 or $Y/Y_0$ is greater than 0.7, the attainment of the intended improvement in melt stability will become insufficient.

PTKs Improved in Melt Stability

According to the heat treatment of this invention, it is possible to obtain a PTK improved in melt stability having $\eta_5^*/(\eta_5^*)_0$ of 2 or less, a melt viscosity increment in terms of times, Y of 3.6 or less, or $Y/Y_0$ of 0.7 or less.

In addition, the heat treated PTK still maintains the physical properties inherent in the melt-stable PTK, namely:

(a) melting point, Tm being 310°–380° C.;
(b) melt crystallization temperature, Tmc (420° C./10 min) being at least 210° C., and residual melt crystallization enthalpy, ΔHmc (420° C./10 min) being at least 10 J/g;
(c) reduced viscosity being 0.2–2.0 dl/g: and
(d) density (at 25° C.) being at least 1.34 g/cm$^3$ when annealed at 280° C. for 30 minutes.

Although PTKs obtained by the preparation process of the present invention and improved in melt stability may be useful as various molding and forming resins by themselves, they may be used as compositions mixed with one or more of stabilizers, one or more of other thermoplastic resins, one or more of fibrous fillers, one or more of inorganic fillers and/or the like, if necessary.

Each of the PTKs obtained by the preparation process of this invention and improved in melt stability and compositions comprising the improved PTK can be formed into a melt-molded or formed product by melt processing. The melt molded or formed product can be obtained by applying a conventional melt processing technique such as extrusion, injection-moding or melt spinning to the PTK or PTK composition. A molded or formed PTK product can also be obtained by the secondary processing or tertiary processing of the molded or formed product.

Stabilizers

Although the PTKs obtained by the preparation process of this invention and improved in melt stability have melt stability sufficiently fit for conventional melt processing, it is more effective to mixed one or more stabilizers with each improved PTK when it is melt-processed under severe conditions or subjected to long-run processing.

As useful stabilizers, may be mentioned non-oxidizable, heat-resistant, hardly-volatile, basic compounds.

As specific, exemplary, high-effective basic compounds, may be mentioned the hydroxides, oxides and aromatic carboxylates of Group IIA metals (except for magnesium) of the periodic table and the aromatic carboxylates, carbonates, hydroxides, phosphates (including condensates) and borates (including condensates) of Group IA metals of the periodic table.

Application Fields

Each PTK obtained by the preparation process of this invention and improved in melt stability, and each composition containing the improved PTK can provide various molded or formed products suitable for various applications in accordance with conventional melt processing techniques. These molded or formed products may be used, for example, as electronic and electric parts such as circuit boards, sealants for electronic parts and connectors; car parts; precision parts such as parts for cameras, watches, clocks and the like; plastic magnets; sealants; sliding members; friction materials; food packages; cooking utensiles; sheets and plates; pipes and tubes; heat resistant covered conductors; blow bottles, rods; profiles; and the like.

Those formed into a fibrous shape may be used, for example, as industrial filters, heat-insulating materials, reinforcing fibers, insulating tapes, insulating cloths, fireproof wears, high-temperature gloves, prepreg fibers, tension members for optical fiber cables, infusible fibers, carbon fibers, various textiles and the like. Those formed into a film-like shape (including a sheet-like shape) may be used, for example, as base films for magnetic recording materials (particularly, including films for vacuum deposition or sputtering and films for magnetic recording films of the perpendicular magnetization type), films for capacitors (particularly, films for chip type capacitors), printed circuit boards (including both flexible and rigid types), insulating films, printer tapes, stampable sheets, various trays, containers, separation membranes, filtration membranes, ion-exchange membranes, etc.

ADVANTAGES OF THE INVENTION

According to this invention, there can be obtained PTKs improved significantly in melt viscosity variation, decrease of crystallinity and the like, which take place due to thermal modification and thermal deterioration of PTK upon melt processing. It has hence become feasible to prolong the long-run time of melt processing considerably, thereby making it possible to achieve a significant reduction in the cost of melt processing.

In addition, the sticking of thermal decomposition products to surfaces of a melt processing equipment, where the equipment is brought into contact with the molten resin, has been reduced, whereby the cleaning of a processing equipment has been rendered easy.

EMBODIMENT OF THE INVENTION

The present invention will hereinafter be described specifically by the following Synthesis Experiments, Examples and Comparative Examples. It should however be borne in mind that the present invention is not limited to the following Synthesis Experiments and Examples so long as it does not depart from the subject matter.

Experiments

Synthesis Experiment 1: (Synthesis of Melt-stable PTK)

A titanium-lined reactor was charged with 90 moles of 4,4'-dichlorobenzophenone (hereinafter abbreviated as "DCBP"; product of Ihara Chemical Industry Co., Ltd.), 90 moles of hydrated sodium sulfide (water content: 53.6 wt.%: product of Sankyo Kasei Co., Ltd.) and 90 kg of N-methylpyrrolidone (hereinafter abbreviated as "NMP") (water content/NMP=5 moles/kg). After the reactor being purged with nitrogen gas, the resultant mixture was heated from room temperature to 240° C. over 1.5 hours and then maintained at 240° C. for 2 hours. In order to apply the stabilization treatment in the final stage of the polymerization, the reaction mixture was then heated to 260° C. over 0.5 hour while charging under pressure a mixture composed of 9.0 moles of DCBP, 18 kg of NMP and 90 moles of water. The resultant mixture was maintained further at 260° C. for 10 minutes to react them.

After completion of the reaction, the reactor was cooled, and the reaction mixture in the form of a slurry was taken out of the reactor and was then poured into about 200 liters of acetone. The resultant polymer was precipitated, collected by filtration, and then washed twice with acetone and additionally twice with water. Acetone and water were removed to obtain the polymer in a wet form.

The wet polymer thus obtained was dried at 100° C. for 24 hours under reduced pressure, thereby obtaining polymer P1 as an ivory powder.

The particle size of the thus-obtained Polymer P1 was determined by an image analyzer ("Omnicon"; manufactured by Shimadzu Corporation). Its average particle size was found to be 13 μm.

Synthesis Experiment 2: (Synthesis of PTK Having Insufficient Melt Stability)

A titanium-lined reactor was charged with 0.5 mole of hydrated sodium sulfide (water content: 53.6 wt.%) and 0.4 liter of NMP. The resultant mixture was heated up to 200° C. under a nitrogen was stream to remove water therefrom, whereby 31.8 g of distilled water containing 3 g of NMP was obtained.

After cooling the reaction system to 80° C., a solution composed of 0.5 mole of DCBP and 0.2 liter of NMP was charged (water content/NMP=1.5 moles/kg). The thus-obtained mixture was maintained, under stirring and nitrogen gas pressure, at 255° C. for 5 hours so as to react them. After the polymerization reaction, the reaction mixture in the form of a slurry was poured into water. A polymer thus precipitated was washed with water and acetone separately and repeatedly, and was then dried to prepare Polymer R1 as a brown powder.

Synthesis Experiment 3: (Synthesis of Conventional PTK)

A reactor made of SUS 316 was charged with 10 moles of sodium sulfide nonahydrate, 5.0 liters of NMP and 10 moles of lithium acetate. The resultant mixture was heated up to 200° C. under a nitrogen gas stream to remove water therefrom, whereby 1580 g of distilled water containing 104 g of NMP was obtained.

After cooling the reaction system to 120° C., a solution composed of 10 moles of DCBP and 0.8 liter of NMP was charged (water content/NMP=1.4 moles/kg). The thus-obtained mixture was maintained, under stirring and nitrogen gas pressure, at 230° C. for 2 hours and then at 250° C. for 1 hour so as to react them. After the polymerization reaction, the reaction mixture in the form of a slurry was poured into water. A polymer thus precipitated was washed with water and acetone separately and repeatedly, and was then dried to prepare Polymer R2 as a brown powder.

Incidentally, Polymer R2 was prepared by following the process disclosed in Publication A. It was provided as an exemplary PTK according to the prior art.

Synthesis Experiment 4: (Synthesis of Conventional PTK)

The following components were charged in a 1-liter reactor made of stainless steel (SUS 316).
 (1) $Na_2S$ flake 61.12 g (0.432 mole; containing 55.16 wt.% of $Na_2S$)
 (2) NaSH flake: 0.79 g (0.009 mole; containing 61.12 wt.% of NaSH)
 (3) DCBP: 108.48 g (0.432 mole)
 (4) Water; 16.9 g
 (5) NMP: 343 g (3.46 moles)

Equimolar amounts (0.432 mole) of $Na_2S$ and DCBP were used. NaSH was charged so as to exceed the amount of DCBP by 2 mole% based on sodium sulfide. The ratio of water content to the amount of the charged NMP was about 7 mole/kg (the water content is a total of the amount of water of hydration contained in the sodium sulfide flake and the water charged). The reactor was closed to conduct alternately nitrogen introduction under a pressure of about 100 psi and degassing, thereby deaerating the reactor. The reaction mixture was then heated to 250° C. over about 1 hour under stirring, and maintained at the same temperature for 3 hours to react them.

Thereafter, the reactor was cooled to about 200° C. In order to end-cap the resulting polymer with DCBP, 3 g of DCBP and 100 g of NMP were charged.

The contents in the reactor was again heated to 250° C. and maintained at the same temperature for 1 hour.

After cooling the reactor, the resulting polymer was take out of the reactor and recovered by filtration with a Buchner funnel. The thus-recovered polymer was washed with portions of 2.5 liters of hot deionized water (about 70° C.) and dried in a vacuum oven of about 80° C., thereby obtaining Polymer R3.

Incidentally, Polymer R3 was prepared by following the process disclosed in Publication C.

Synthesis Experiment 5: (Synthesis of Conventional PTK)

Experiment 5-1

A 1-liter autoclave made of stainless steel (SUS 316) was charged with 0.5 mole of sodium hydrosulfide (NaSH; 45.1 g of an aqueous solution of NaSH having a purity of 62.1 wt.%), 0.5 mole of sodium hydroxide (NaOH), 0.5038 mole of DCBP, 1.56 moles of deionized water and 6.2 moles of NMP.

The autoclave charged with the above components was purged, under stirring, with nitrogen several times. The reaction mixture was heated to 250° C. over about 1 hour and maintained at the same temperature for 3 hours. The rate of the stirring was accelerated and the autoclave was heated up to 300° C. The heating was stopped to cool the autoclave spontaneously. The contents in the autoclave was collected by filtration to recover a gray solid. The solid was thoroughly wased with deionized water and then dried in an oven of 100° C. The thus-obtained Polymer R4 was in a powdery form of a low bulk density.

Experiment 5-2

Polymer R5 was obtained by conducting a reaction and recovery in the same manner as in Experiment 5-1 except that the reaction mixture was cooled to room temperature immediately after heating it to 250° C. and maintaining it at the same temperature for 3 hours.

Incidentally, Polymers R4 and R5 were prepared by following the process disclosed in publication D.

Synthesis Experiment 6: (Synthesis of Conventional PTK) Experiment 6-1

A 1-liter autoclave made of stainless steel (SUS 316) was charged with raw materials in accordance with the following procedure so as to react them.

The autoclave was charged with 0.5 mole of sodium hydrosulfide (45.1 g of an aqueous solution of NaSH having a purity of 62.1 wt.%), 0.5038 mole of sodium hydroxide, 0.5038 mole (126.5 g) of DCBP, 1.56 moles (28.1 g) of deionized water and 6.21 moles (615.4 g) of NMP. The autoclave was sealed to deaerate it by a cycle of nitrogen-pressurization and reduction of pressure. The stirrer was actuated at 260 rpm. The reaction mixture was heat to 250° C. over about 1 hour and maintained at the same temperature for 3 hours. The rotational speed of the stirrer was then increased to 500 rpm and the temperature of the reaction mixture was raised to 300° C.

When the temperature reached 300° C., the internal pressure of the autoclave was 52 kg/cm². The heating was immediately stopped to cool the reaction mixture spontaneously. The cooling rate from 300° C. to 160° C. was 1.6° C./min.

The resulting polymer slurry was taken out of the autoclave cooled to room temperature and the polymer was recovered by filtration with a Buchner funnel. The thus-recovered polymer was thoroughly washed with deionized water and then dried in a vacuum atmosphere of 100° C., thereby obtaining polymer R6.

Experiment 6-2

Polymer R7 was obtained by conducting a reaction and recovery in the same manner as in Experiment 6-1 except that the reaction mixture was cooled to room temperature immediately after heating it to 250° C. and maintaining it at the same temperature for 3 hours.

Experiment 6-3

Polymer R8 was obtained by conducting a reaction and recovery in the same manner as in Experiment 6-1 except that 95 ml of deionized water was charged under pressure in the autoclave and the contents were heated up to about 300° C. after the reaction mixture was heated to 250° C. and maintained at the same temperature for 3 hours.

This Experiment 6-3 was conducted in order to evaluate the melt stability of the polymer obtained in the case when water was charged under pressure at 250° C. in the autoclave because it had been difficult to charge the water under pressure at 300° C.

Incidentally, Polymers R6, R7 and R8 were prepared by following the processes disclosed in Publications E and F respectively.

Measurement 1 of Physical Properties

Measurement of melting points

With respect to each of the PTKs thus obtained, its melting point, Tm was measured as an index of its heat resistance. The measurement was performed in the following manner. About 10 mg of each PTK (powder) was weighed. The sample was held at 50° C. for 5 minutes in an inert gas atmosphere, then heated up at a rate of 10° C./min so as to measure its melting point on a DSC (Model TC10A; manufactured by Mettler Company).

Results are collectively shown in Table 1.

Measurements of melt crystallization temperatures and residual melt crystallization enthalpies With respect to each of the PTK powders obtained in Synthesis Experiments, its melt crystallization temperature, Tmc (420° C./10 min) and residual melt crystallization enthalpy, ΔHmc (420° C./10 min) were measured as an index of its melt stability.

Namely, the temperature corresponding to a peak of melt crystallization measured by the DSC is represented by Tmc (420° C./10 min) and the quantity of heat converted from the area of the peak was taken as residual melt crystallization enthalpy, ΔHmc (420° C./10 min). Described specifically, about 10 mg of each PTK (powder) was weighed. After holding the PTK at 50° C. for 5 minutes in an inert gas atmosphere, it was heated at a rate of 75° C./min up to 420° C. and held at 420° C. for 10 minutes. While cooling the PTK at a rate of 10° C./min, its Tmc (420° C./10 min) and ΔHmc (420° C./10 min) were measured thereafter.

Results are collectively shown in Table 1.

Measurement of reduced viscosities

Reduced viscosities, $\eta_{red}$ were determined by dissolving each PTK powder in 98 percent by weight sulfuric acid to give a polymer concentration of 0.5 g/dl and then measuring the resultant solution at 25° C. by means of a Ubbellohde viscometer.

Measurement of densities of annealed sheets

Each PTK powder was placed between two sheets of polyimide film ("Kapton"; product of E. I. du Pont de Nemours & Co., Inc.). It was preheated at 385° C. for 2 minutes and then press-formed at 385° C. for 0.5 minute by a hot press. It was then quenched to obtain an amorphous sheet whose thickness was about 0.15 mm.

A part of the amorphous sheet was annealed at 280° C. for 30 minutes to use it as an annealed sample with an increased degree of crystallization. Its density was measured at 25° C. by means of a density gradient tube of a [lithium bromide/water] system. Incidentally, the remaining part of the amorphous sheet was used as a sample for evaluating melt stability, which will be described subsequently.

Heat Treatment Test 1

With respect to each PTK prepared in Synthesis Experiments 1-3, a heat treatment test was conducted with a view toward improving its melt stability.

The heat treatment test was performed in the following manner. Each PTK powder was placed in an oven controlled to a predetermined atmosphere and temperature to heat it for a prescribed period of time, thereby subjecting it to a heat treatment. Incidentally, the heat treatment in vacuo was conducted in a vacuum oven.

Kinds of the PTKs treated, treating atmospheres, treating temperatures and treating time are shown collectively in Table 2.

Measurement 2 of Physical Properties

Measurement of densities of annealed sheets

Using each PTK powder subjected to the heat treatment, an amorphous sheet whose thickness was about 0.15 mm was produced in the same manner as described above.

A part of the amorphous sheet was used directly as a sample for evaluating melt stability, while the remaining part of the amorphous sheet was annealed at 280° C. for 30 minutes to use it as an annealed sample with an increased degree of crystallization. The density of the annealed sheet was measured at 25° C. by means of the density gradient tube of the [lithium bromide/water] system.

Evaluation of melt stability

Regarding each amorphous sheet of the PTKs not subjected and subjected to the heat treatment, in which the PTKs had been prepared for the above-described measurements of densities, its melt viscosity was measured. Namely, about 20 g of a sample obtained by chopping the amorphous sheet was placed in a barrel of a Capirograph controlled to 385° C. The melt viscosity was measured at a shear rate of 1200 sec$^{-1}$ after holding it for 5 minutes and 30 minutes, thereby determining melt viscosities, $(\eta_5^*)_0$ and $(\eta_{30}^*)_0$ of each non-heat-treated PTK and $\eta_5^*$ and $\eta_{30}^*$ of each heat-treated PTK.

From these values, a ratio $\eta_5^*/(\eta_5^*)_0$ and the melt viscosity increment in terms of times, $Y_0 = (\eta_{30}^*)_0/(\eta_5^*)_0$ and $Y = \eta_{30}^*/\eta_5^*$ were determined.

A ratio $Y/Y_0$ was then calculated.

TABLE 1

| Polymer No. | P1 | R1 | R2 | R3 | R4 | R5 | R6 | R7 | R8 |
|---|---|---|---|---|---|---|---|---|---|
| Heat resistant (powdery polymer) Tm [°C.] | 365 | 363 | 335 | 365 | — | — | — | — | — |
| Melt stability (powdery polymer) | | | | | | | | | |
| ΔHmc (420° C./10 min) [J/g] | 48 | 0 | 0 | 0 | 0 | 0 | 0 | 0 | 0 |
| Tmc (420° C./10 min) [°C.] | 295 | ND*1 | ND*1 | ND*1 | ND*1 | ND*1 | ND*1 | ND*1 | ND*1 |
| Molecular weight Reduced viscosity, $\eta_{red}$ [25° C., dl/g] | 0.70 | 0.35 | — | 0.70 | 0.30 | 0.62 | 0.36 | 0.61 | 0.96 |
| Density Annealed sheet [25° C., g/cm³] | 1.35 | 1.32 | <1.30 | — | — | — | — | — | — |
| Remarks | Melt-stable PTK | PTK having insufficient melt stability | | | | Conventional PTKs | | | |

*1 ND: Not detected.

Measurements of melting points, melt crystallization temperatures, residual melt crystallization enthalpies and reduced viscosities With respect to each PTK powder after subjecting it to the heat treatment, its melting point, melt crystallization temperature, residual melt crystallization enthalpy and reduced viscosity were measured in accordance with the above-described measuring methods, respectively. Results are shown collectively in Table 2.

unsuccessfully improved in melt stability even when they were subjected to the heat treatments. Accordingly, even if such PTKs having poor melt stability are used with a view toward improving their melt stability, the objects of this invention can not be attained.

Judging from the conditions of the heat treatments in addition, the heat treatment at 400° C. which is a temperature higher than the melting point of the melt-stable PTK will result in a PTK lost in its flowability (probably, due to a crosslinking and/or carbonizing reaction).

TABLE 2

| Run No. | 1 | 2 | 3 | 4 | 5 | 6 | 7 | 8 | 9 |
|---|---|---|---|---|---|---|---|---|---|
| PTK polymer No. used | P1 | P1 | P1 | P1 | P1 | P1 | P1 | R1 | R2 |
| Non-heat-treated PTK | | | | | | | | | |
| $(\eta_5^*)_0$ [poise] | 230 | 230 | 230 | 230 | 230 | 230 | 230 | 70 | —*3 |
| $(\eta_{30}^*)_0$ [poise] | 1150 | 1150 | 1150 | 1150 | 1150 | 1150 | 1150 | 770 | —*3 |
| Heat-treating conditions | | | | | | | | | |
| Atmosphere | In nitrogen | In vacuo | In air | In nitrogen | In air | In air | In air | In air | In air |
| Temperature [°C.] | 300 | 300 | 300 | 275 | 400 | 180 | 300 | 300 | 300 |
| Time [min] | 60 | 60 | 60 | 60 | 60 | 600 | 3 | 60 | 60 |
| Heat-treated PTK | | | | | | | | | |
| Tm [°C.] | 365 | 365 | 364 | 365 | ND*1 | 365 | 365 | 363 | 330 |
| ΔHmc (420° C./10 min) [J/g] | 50 | 50 | 53 | 50 | ND*1 | 48 | 48 | 7 | 0 |
| Tmc (420° C./10 min) [°C.] | 305 | 302 | 310 | 300 | ND*1 | 295 | 295 | 217 | ND*1 |
| Reduced viscosity, $\eta_{red}$ [dl/g] | 0.70 | 0.70 | 0.72 | 0.70 | —*2 | 0.70 | 0.70 | 0.47 | —*2 |

| Run No. | 1 | 2 | 3 | 4 | 5 |
|---|---|---|---|---|---|
| PTK polymer No. used | P1 | P1 | P1 | P1 | P1 |
| Heat-treated PTK | | | | | |
| Density (annealed sheet) [g/cm³] | 1.35 | 1.35 | 1.35 | 1.35 | <1.30 |
| $\eta_5^*$ [poise] | 240 | 230 | 240 | 230 | —*3 |
| $\eta_{30}^*$ [poise] | 360 | 300 | 240 | 390 | —*3 |
| Evaluation of Melt stability | | | | | |
| $\gamma_0 = (\eta_{30}^*)_0/(\eta_5^*)_0$ | 5.0 | 5.0 | 5.0 | 5.0 | 5.0 |
| $\eta_5^*/(\eta_5^*)_0$ | 1.0 | 1.0 | 1.0 | 1.0 | |
| $\gamma = \eta_{30}^*/\eta_5^*$ | 1.5 | 1.3 | 1.0 | 1.7 | |
| $\gamma/\gamma_0$ | 0.3 | 0.3 | 0.2 | 0.3 | |
| Remarks | (Example) | (Example) | (Example) | (Example) | Higher temp. treatment (Comp. Ex.) |

| Run No. | 6 | 7 | 8 | 9 |
|---|---|---|---|---|
| PTK polymer No. used | P1 | P1 | R1 | R2 |
| Heat-treated PTK | | | | |
| Density (annealed sheet) [g/cm³] | 1.35 | 1.35 | 1.33 | <1.30 |
| $\eta_5^*$ [poise] | 230 | 230 | 210 | —*3 |
| $\eta_{30}^*$ [poise] | 1130 | 1150 | 840 | —*3 |
| Evaluation of Melt stability | | | | |
| $\gamma_0 = (\eta_{30}^*)_0/(\eta_5^*)_0$ | 5.0 | 5.0 | 11.0 | |
| $\eta_5^*/(\eta_5^*)_0$ | 1.0 | 1.0 | 3.0 | |
| $\gamma = \eta_{30}^*/\eta_5^*$ | 4.9 | 5.0 | 4.0 | |
| $\gamma/\gamma_0$ | 1.0 | 1.0 | 0.4 | |
| Remarks | Lower-temp. treatment (Comp. Ex.) | Shorter-period treatment (Comp. Ex.) | PTK having insufficient melt stability (Comp. Ex.) | Conventional PTK (Comp. Ex.) |

*1ND: Not detected.
*2Substantially insoluble in 98 wt. % sulfuric acid.
*3Measurement of melt viscosity was infeasible due to loss of flowability.

As is apparent from Table 2, $\eta_5^*/(\eta_5^*)_0$ of Polymer P1, which was a PTK having high melt stability, became 1.0 by subjecting it to heat treatments under suitable conditions, thereby indicating that the flowability of the PTK scarcely changed even after subjecting it to the heat treatments. In addition, it was also understood that its melt viscosity increments in terms of times, Y and Y/Y$_0$ reduced to 3.5 or less (1.0–1.7) and to 0.7 or less (0.2–0.3) respectively, so that the melt stability of Polymer P1 had been improved.

On the other hand, polymer R1, which had insufficient melt stability, and polymer R2, which had been obtained in accordance with the conventional production process, was poor in melt stability prior to the heat treatments (see Table 1). Therefore, such PTKs were In the heat treatments at a temperature as low as 200° C. or lower and for a period of time as short as 3 minutes on the contrary, Y will be almost equal to Y$_0$. It is therefore apparent that the melt stability of Polymer P1 is not substantially improved.

Heat Treatment Test 2

With respect to each PTK obtained in Synthesis Experiments, heat treatments were respectively conducted for periods of time of 0–120 minutes (0, 15 and 120 minutes), in air, in a powdery state and at a temperature of 320° C. Results are shown in Table 3.

As is easily understood from Table 3, the reduced viscosity of the PTK according to this invention is 0.78 when subjected to the heat treatment for 15 minutes at 320° C. in air. Therefore, it does not substantially change compared with 0.77 before the heat treatment.

Furthermore, a variation in its melt viscosity does not also occur because $\eta_5^*/(\eta_5^*)_0$ is equal to 1. Judging from its ΔHmc (420° C./10 min) and Tmc (420° C./10 min) in addition, its crystallinity is sufficiently maintained. In other words, the PTK of this invention suitable heat treatment without increasing its melt viscosity and/or decreasing its crystallinity due to a branching and/or crosslinking reaction.

On the contrary, polymers R3-R8 poor in melt stability formed portions insoluble in concentrated sulfuric acid when held for 15 minutes at 320° C., thereby indicating that a crosslinking reaction proceeded. Judging from variations in their melt viscosities in addition, their melt stability after the heat treatments are very poor. Any improving effects are not hence recognized.

thereby obtaining pellet samples (Extrusion-1 and Extrusion-2) of the respective compositions.

The nozzle of the extruder was then replaced by a slit die. The pellet samples (Extrusion-1 and Extrusion-2) were separately fed, extruded into plates at a cylinder temperature of 375° C. and an average resin residence time of about 3 minutes in the cylinder, quenched and then cut, thereby obtaining plate-like extrudates respectively. The thus-quenched extrudates were subjected to annealing at 280° C. for 5 hours to obtain extruded products (annealed products).

Physical properties (densities of PTK portions, tensile strength and tensile modulus) of the extruded products (annealed products) are shown in Table 4.

With respect to the heat treated polymer, its long-run property was good compared with the non-heat-treated polymer and the sticking of resin decomposition products to the processing equipment was reduced, whereby

TABLE 3

| Run No. | Polymer | Effects of heat treatment (at 320° C. in air) | | | | | | | | |
|---|---|---|---|---|---|---|---|---|---|---|
| | | Reduced viscosity ($\eta_{red}$) | | | ΔHmc (420° C./10 min) [J/g] | | | Tmc (420° C./10 min) [°C.] | | |
| | | 0 min | 15 min | 120 min | 0 min | 15 min | 120 min | 0 min | 15 min | 120 min |
| 10 | P1*1 | 0.77 | 0.78 | 0.84 | 49 | 48 | 48 | 300 | 308 | 311 |
| 11 | R3 | 0.70 | *2 | *2 | 0 | 0 | 0 | ND*3 | ND*3 | ND*3 |
| 12 | R4 | 0.30 | *2 | *2 | 0 | 0 | 0 | ND*3 | ND*3 | ND*3 |
| 13 | R5 | 0.62 | *2 | *2 | 0 | 0 | 0 | ND*3 | ND*3 | ND*3 |
| 14 | R6 | 0.36 | *2 | *2 | 0 | 0 | 0 | ND*3 | ND*3 | ND*3 |
| 15 | R7 | 0.61 | *2 | *2 | 0 | 0 | 0 | ND*3 | ND*3 | ND*3 |
| 16 | R8 | 0.96 | *2 | *2 | 0 | 0 | 0 | ND*3 | ND*3 | ND*3 |

| Run No. | Polymer | Effects of heat treatment (at 320° C. in air) Melt stability | | | | Remarks |
|---|---|---|---|---|---|---|
| | | 0 min | 15 min | | | |
| | | γ0 | γ | γ/γ0 | $\eta_5^*/(\eta_5^*)_0$ | |
| 10 | P1*1 | 4.5 | 1.2 | 0.3 | 1.0 | Example |
| 11 | R3 | >10*4 | *4 | *4 | *4 | Comp. Ex. |
| 12 | R4 | >10*4 | *4 | *4 | *4 | Comp. Ex. |
| 13 | R5 | >10*4 | *4 | *4 | *4 | Comp. Ex. |
| 14 | R6 | >10*4 | *4 | *4 | *4 | Comp. Ex. |
| 15 | R7 | >10*4 | *4 | *4 | *4 | Comp. Ex. |
| 16 | R8 | >10*4 | *4 | *4 | *4 | Comp. Ex. |

*1A polymer sample obtained by conducting Synthesis Experiment 1 on a 1/10 scale. The physical properties of the polymer were as follows. Tm: 363° C.; ΔHmc (420° C./10 min): 49 J/g; Tmc (420° C./10 min): 300° C.; reduced viscosity, $\eta_{red}$: 0.77 dl/g; density (annealed): 1.35 g/cm³.
*2The measurement of reduced viscosities was infeasable because some portions were insoluble in concentrated surfuric acid and turbidity hence occurred.
*3Not detected.
*4It was difficult to find accurate values due to foaming.

Illustrative Experiment of Extrusion

One part by weight of titanium oxide powder was added to each 100 parts by weight of Polymer P1 and a polymer improved in melt stability by subjecting Polymer P1 to a heat treatment for 60 minutes at 300° C. in air. Each of the resulting mixtures was dry-blended in a Henschel mixer, charged under a nitrogen was stream into twin-screw extruder equipped with screws rotatable in the same direction and a nozzle of 5 mm across and having a cylinder diameter of 35 mm, molten and kneaded at a cylinder temperature of 375° C. and an average resin residence time of about 3 minutes in the cylinder, extruded into strands, quenched and chopped, the cleaning of the processing equipment was rendered easy.

Incidentally, the density of the PTK portion was determined from the densities of the extruded product and titanium oxide in accordance with the following equation.

$$\text{Density of extruded product} = \frac{1}{\frac{\text{Weight fraction of PTK portion}}{\text{Density of PTK portion}} + \frac{1 - (\text{Weight fraction of PTK portion})}{\text{Density of titanium oxide}}}$$

Incidentally, the densities of the extruded products were measured by a density gradient tube of a [lithium bromide/water] system at 25° C.

TABLE 4

| Run No. | Extrusion-1 | Extrusion-2 |
|---|---|---|
| Composition of pellets (parts by weight) | | |
| PTK | 100 | 100 |
| TiO2 | 1 | 1 |
| Physical properties of extruded products | | |

TABLE 4-continued

| Run No. | Extrusion-1 | Extrusion-2 |
| --- | --- | --- |
| Density of PTK portion (25° C.)[*1] | 1.35 g/cm$^3$ | 1.35 g/cm$^3$ |
| Tensile strength (ASTM-D638) | 10 kg/mm$^2$ | 10 kg/mm$^2$ |
| Tensile modulus (ASTM-D638) | 220 kg/mm$^2$ | 220 kg/mm$^2$ |
| Remarks | Non-heat-treated PTK (Comp. Example) | Heat-treated PTK (Example) |

[*1] Calculation was made assuming that the density of TiO$_2$ was 4.26 g/cm$^3$.

Illustrative Experiment of Injection Molding

To each 100 parts by weight of Polymer P1 and a polymer improved in melt stability by subjecting Polymer P1 to a heat treatment for 60 minutes at 300° C. in air, 60 parts by weight of glass fibers (diameter: 13 μm, length: 3 mm; "#ECS 03T-717K"; product of Nippon Electric Glass Co., Ltd.) were added. Each of the resultant mixture was dry-blended in a tumbler blender, and then molten, kneaded and extruded In the same manner as in the preparation of the pellets in the aforementioned extrusion experiment. Pellet samples (Injection-1 and Injection-2) were thus obtained from the respective compositions.

The thus-obtained pellet samples (Injection-1 and Injection-2) were separately charged into an injection molding machine under a nitrogen gas stream and then injection-molded under the following molding conditions to obtain injection-molded products. Cylinder temperature: 375° C., mold temperature: 200° C., average resin residence time in the cylinder: up to about 1.5 minutes, injection maintaining pressure: 1,000 kg/cm$^2$ and injection cycle: about 1 minute. The injection-molded products were annealed at 280° C. for 5 hours. Physical properties (densities of PTK portions, flexural strength, flexural modulus and flexural deformation) of the thus-annealed products are shown in Table 5.

With respect to the heat-treated polymer, its long-run property was good compared with the non-heat-treated polymer and the sticking of resin decomposition products to the processing equipment was reduced.

Preparation Experiment of Formed Fibrous Products

Each 100 parts by weight of Polymer P1 and a polymer improved in melt stability by subjecting Polymer P1 to a heat treatment for 60 minutes at 300° C. in air were separately added with prescribed amounts of fine powders of CaCO$_3$ and Ca(OH)$_2$. Each of the resultant mixture was dry-blended in a tumbler blender, and then molten, kneaded and extruded in the same manner as in the preparation of the pellets in the afore-mentioned extrusion experiment. Pellet samples (Spinning-1 and Spinning-2) were thus obtained from the respective compositions. The pellet samples were separately fed to a melt-spinning testing machine (manufactured by Fuji Filter Company) equipped with a spinneret which had 18 holes, each of 0.5 mm across, and then melt-spun at R1 (draw down ratio: the ratio of the take-up speed of spun fiber to the discharge rate of the resin from the spinneret) of about 70 times so that their corresponding unstretched fibers were obtained. Using a device the fibers were stretched at 155° C. to a draw ratio of 3 times. They were then heat set at 280° C. for 2 seconds. Physical properties (densities of PTK portions, fiber diameter, tensile strength and tensile modulus) of the resultant fiber samples are shown in Table 6. With respect to the heat-treated polymer, its long-run property was good compared with the non-heat-treated polymer and the sticking of resin decomposition products to the processing equipment was reduced, whereby the cleaning of the processing equipment was rendered easy.

TABLE 5

| Run No. | Injection-1 | Injection-2 |
| --- | --- | --- |
| Composition of pellets (parts by weight) | | |
| PTK | 100 | 100 |
| Glass fibers | 60 | 60 |
| Properties of injection-molded products | | |
| Density of PTK portion (25° C.)[*1] | 1.35 g/cm$^3$ | 1.35 g/cm$^3$ |
| Flexural strength (ASTM-D760) | 17 kg/mm$^2$ | 17 kg/mm$^2$ |
| Flexural modulus (ASTM-D760) | 1800 kg/mm$^2$ | 1800 kg/mm$^2$ |
| Flexural deformation (ASTM-D760) | 6 mm | 6 mm |
| Remarks | Non-heat-treated PTK (Comp. Example) | Heat-treated PTK (Example) |

[*1] Calculation was made assuming that the density of glass fibers was 2.54 g/cm$^3$.

TABLE 6

| Run No. | Spinning-1 | Spinning-2 |
| --- | --- | --- |
| Composition of pellets (parts by weight) | | |
| PTK | 100 | 100 |
| CaCO$_3$ | 0.2 | 0.2 |
| Ca(OH)$_2$ | 0.2 | 0.2 |
| Properties of formed fibrous products | | |
| Density of PTK portion (25° C.)[*1] | 1.36 g/cm$^3$ | 1.36 g/cm$^3$ |
| Fiber diameter | about 30 μm | about 30 μm |
| Tensile strength (JIS-L1013) | 28 kg/mm$^2$ | 28 kg/mm$^2$ |
| Tensile modulus (JIS-L1013) | 380 kg/mm$^2$ | 380 kg/mm$^2$ |
| Remarks | Non-heat-treated PTK | Heat-treated PTK |

TABLE 6-continued

| Run No. | Spinning-1 | Spinning-2 |
|---|---|---|
| | (Comp. Example) | (Example) |

*[1] Calculation was made assuming that the densities of $CaCO_3$ and $Ca(OH)_2$ were 2.71 g/cm³ and 2.24 g/cm³ respectively.

Preparation Experiment of Stretched Films

The above-described pellet samples (Spinning-1 and Spinning-2) were separately fed under a nitrogen gas stream to a single-screw extruder having a cylinder diameter of 35 mm and equipped with a small T-die, melt-extruded at a cylinder temperature of 375° C. for a resin residence time of about 3 minutes in the cylinder and quenched by cooling rolls, so that amorphous films having an average thickness of 150 μm were prepared respectively.

With respect to portions of the thus-obtained amorphous films, they were separately stretched at 155° C. to a draw ratio of 3.0 times in the machine direction and then at 157° C. to a draw ratio of 3.0 times in the transverse direction by using a biaxial stretching testing machine (manufactured by Toyo Seiki Seisaku-sho, Ltd.), heat set at 310° C. for 5 minutes under a constant length, and then subjected to thermal relaxation at 290° C. for 5 minutes under no stress, so that biaxially-properties (densities of PTK portions, tensile strength, tensile modulus and coefficient of surface dynamic friction) of the thus-obtained stretched films are shown in Table 7. With respect to the heat-treated polymer, its long-run property was good compared with the non-heat-treated polymer and the sticking of resin decomposition products to the processing equipment was reduced, whereby the cleaning of the processing equipment was rendered easy.

TABLE 7

| Run No. | Stretched film 1 | Stretched film 2 |
|---|---|---|
| PTK pellets used | Spinning-1 | Spinning-2 |
| Properties of stretched films | | |
| Density of PTK portion (25° C.) | 1.36 g/cm³ | 1.36 g/cm³ |
| MD/TD*[1] tensile strength (ASTM-D638) | 16/15 kg/mm² | 16/15 kg/mm² |
| MD/TD*[1] tensile modulus (ASTM-D638) | 390/380 kg/mm² | 390/380 kg/mm² |
| Coefficient of surface dynamic friction*[2] | 0.6 | 0.6 |
| Remarks | Non-heat-treated PTK (Comp. Example) | Heat-treated PTK (Example) |

*[1] MD: Machine direction; TD: Transverse direction.
*[2] Measured against another film of the same type in accordance with ASTM-D1894.

We claim:

1. A process for the preparation of a poly(arylene thioether-ketone) improved in melt stability, which comprises subjecting a poly(arylene thioetherketone) to a heat treatment for $5-5\times10^3$ minutes in a powdery state and a temperature range of 200°-350° C., said poly(arylene thioether-ketone) having predominant recurring units of the formula

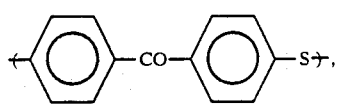

wherein the —CO— and —S— are in the para position to each other, and having the following physical properties (a)-(c):

(a) melting point, Tm being 310°-380° C.;

(b) melt crystallization temperature, Tmc (420° C./10 min) being at least 210° C., and residual melt crystallization enthalpy, ΔHmc (420° C./10 min) being at least 10 J/g, wherein Tmc (420° C./10 min) and ΔHmc (420° C./10 min) are determined by a differential scanning calorimeter at a cooling rate of 10° C./min after the poly(arylene thioether-ketone) is held at 50° C. for 5 minutes in an inert gas atmosphere, heated to 420° C. at a rate of 75° C./min and then held for 10 minutes at 420° C.: and (c) reduced viscosity being 0.2-2.0 dl/g as determined by viscosity measurement at 25° C. and a polymer concentration of 0.5 g/dl in 98 percent by weight sulfuric acid.

2. The process as claimed in claim 1, wherein the heat treatment is conducted in such a manner that the poly(arylene thioether-ketone) after the heat treatment still maintains the physical properties (a)-(c) and a ratio $\eta_5^*/(\eta_5^*)_0$ is 2 or less, in which $\eta_5^*$ is a melt viscosity of the poly(arylene thioether-ketone) after the heat treatment as measured at a shear rate of 1200 sec$^{-1}$ after holding it at 385° C. for 5 minutes and $(\eta_5^*)_0$ is a melt viscosity of the poly(arylene thioetherketone) before the heat treatment as measured at a shear rate of 1200 sec$^{-1}$ after holding it at 385° C. for 5 minutes.

3. The process as claimed in claim 1, wherein the heat treatment is conducted in such a manner that the poly(arylene thioether-ketone) after the heat treatment still maintains the physical properties (a)-(c) and a melt viscosity increment in terms of times, $Y=\eta_{30}^*/\eta_5^*$ is 3.5 or less, in which $\eta_5^*$ and $\eta_{30}^*$ are melt viscosities of the poly(arylene thioether-ketone) after the heat treatment as measured at a shear rate of 1200 sec$^{-1}$ after holding it respectively for 5 minutes and 30 minutes at 385° C.

4. The process as claimed in claim 3, wherein the heat treatment is conducted in such a manner that a ratio $Y/Y_0$ is 0.7 or less, in which Y and $Y_0$ mean $\eta_{30}^*/\eta_5^*$ and $(\eta_{30}^*)_0/(\eta_5^*)_0$ respectively, $(\eta_5^*)_0$ and $(\eta_{30}^*)_0$ are melt viscosities of the poly(arylene thioether-ketone) before the heat treatment as measured at a shear rate of 1200 sec$^{-1}$ after holding it respectively for 5 minutes and 30 minutes at 385° C.

5. The process as claimed in claim 1, wherein both poly(arylene thioether-ketones) before and after the heat treatment have a density of at least 1.34 g/cm³ at 25° C. when annealed at 280° C. for 30 minutes.

* * * * *